(12) United States Patent
Low et al.

(10) Patent No.: US 10,331,740 B2
(45) Date of Patent: Jun. 25, 2019

(54) SYSTEMS AND METHODS FOR OPERATING A SERVER-SIDE DATA ABSTRACTION LAYER

(71) Applicant: Apple Inc., Cupertino, CA (US)

(72) Inventors: Yucheng Low, Seattle, WA (US); Haijie Gu, Seattle, WA (US); Ping Wang, Seattle, WA (US); Evan Samanas, Seattle, WA (US); Sethu Raman, Seattle, WA (US); Carlos Guestrin, Seattle, WA (US)

(73) Assignee: Apple Inc., Cupertino, CA (US)

( * ) Notice: Subject to any disclaimer, the term of this patent is extended or adjusted under 35 U.S.C. 154(b) by 529 days.

(21) Appl. No.: 14/619,020

(22) Filed: Feb. 10, 2015

(65) Prior Publication Data

US 2015/0227569 A1 Aug. 13, 2015

Related U.S. Application Data

(60) Provisional application No. 61/938,126, filed on Feb. 10, 2014, provisional application No. 62/026,591, filed on Jul. 18, 2014.

(51) Int. Cl.
*G06F 17/30* (2006.01)
*G06F 16/901* (2019.01)
(Continued)

(52) U.S. Cl.
CPC ...... *G06F 16/9024* (2019.01); *G06F 16/2453* (2019.01); *G06F 16/254* (2019.01);
(Continued)

(58) Field of Classification Search
CPC ......... G06F 17/30563; G06F 17/30569; G06F 17/30578; G06F 17/30404;
(Continued)

(56) References Cited

U.S. PATENT DOCUMENTS 5,551,029 A 8/1996 Jagadish et al.
6,009,271 A 12/1999 Whatley
(Continued)

OTHER PUBLICATIONS

U.S. Appl. No. 14/619,025, filed Feb. 10, 2015, Haijie Gu et al.
U.S. Appl. No. 14/804,220, filed Feb. 20, 2015, Yucheng Low et al.

*Primary Examiner* — Dangelino N Gortayo
(74) *Attorney, Agent, or Firm* — Robert C. Kowert; Meyertons, Hood, Kivlin, Kowert & Goetzel, P.C.

(57) ABSTRACT

A method receives a first request from a client object at a device. The first request specifies a data source. In response to the first request, the method uploads data from the data source, stores the data as a plurality of first columns, and instantiates a first server object that provides access to the first columns. The method later receives a second request from the client object. The second request specifies a transformation of the data. In response to the second request, the method stores one or more additional columns and instantiates a second server object that provides access to the additional columns and one or more of the first columns. Each of the additional columns is constructed from the first columns according to the requested transformation, and each of the additional columns includes a plurality of data values all having the same data type.

21 Claims, 14 Drawing Sheets

(51) Int. Cl.
  *G06F 16/2453* (2019.01)
  *G06F 16/25* (2019.01)
  *G06F 16/958* (2019.01)
  *G06F 16/22* (2019.01)
  *G06F 16/23* (2019.01)
  *G06F 16/2455* (2019.01)
  *G06F 16/27* (2019.01)
  *G06F 16/21* (2019.01)

(52) U.S. Cl.
  CPC .......... *G06F 16/958* (2019.01); *G06F 16/211* (2019.01); *G06F 16/221* (2019.01); *G06F 16/2228* (2019.01); *G06F 16/2343* (2019.01); *G06F 16/2358* (2019.01); *G06F 16/24568* (2019.01); *G06F 16/258* (2019.01); *G06F 16/273* (2019.01)

(58) Field of Classification Search
  CPC ......... G06F 17/30442; G06F 17/30566; G06F 17/30958; G06F 17/30463; G06F 17/30545; G06F 16/254; G06F 16/211; G06F 16/258; G06F 16/273; G06F 16/221; G06F 16/256; G06F 16/2379; G06F 16/24542; G06F 16/27
  USPC ....... 707/713, 602, 718, 756, 708, 737, 777, 707/798
  See application file for complete search history.

(56) References Cited

U.S. PATENT DOCUMENTS

| | | | |
|---|---|---|---|
| 6,256,651 B1 | 7/2001 | Tuli | |
| 7,590,639 B1 | 9/2009 | Ivanova et al. | |
| 7,877,370 B2* | 1/2011 | Piedmonte | G06F 17/30442 707/708 |
| 7,899,799 B2 | 3/2011 | Furuya | |
| 8,504,568 B2* | 8/2013 | Chandrasekhara | H04L 65/403 707/737 |
| 8,612,971 B1* | 12/2013 | Fitzgerald | G06F 9/45533 718/1 |
| 8,775,476 B2* | 7/2014 | Henderson | G06F 16/273 707/798 |
| 8,875,145 B2 | 10/2014 | Atterbury et al. | |
| 8,954,418 B2* | 2/2015 | Faerber | G06F 16/2433 707/718 |
| 9,092,468 B2* | 7/2015 | Nelke | G06F 17/30303 |
| 9,165,035 B2 | 10/2015 | McSherry et al. | |
| 9,235,652 B1 | 1/2016 | Jeffery et al. | |
| 9,411,864 B2* | 8/2016 | Glider | G06F 17/30578 |
| 9,430,505 B2* | 8/2016 | Padmanabhan | G06F 17/303 |
| 9,563,486 B1 | 2/2017 | Narsude et al. | |
| 9,613,116 B2* | 4/2017 | Bryan | G06F 17/30569 |
| 9,792,325 B2 | 10/2017 | Bruno et al. | |
| 2002/0198984 A1 | 12/2002 | Goldstein et al. | |
| 2004/0267747 A1 | 12/2004 | Choi et al. | |
| 2005/0001837 A1 | 1/2005 | Shannon | |
| 2005/0283337 A1 | 12/2005 | Sayal | |
| 2007/0008317 A1 | 1/2007 | Lundstrom | |
| 2007/0038978 A1 | 2/2007 | Meijer et al. | |
| 2007/0214111 A1 | 9/2007 | Jin et al. | |
| 2012/0089562 A1* | 4/2012 | Deremigio | G06F 17/30563 707/602 |
| 2012/0150791 A1* | 6/2012 | Willson | G06F 17/30563 707/600 |
| 2012/0158623 A1 | 6/2012 | Bilenko et al. | |
| 2012/0221528 A1* | 8/2012 | Renkes | G06F 17/30315 707/674 |
| 2012/0239609 A1* | 9/2012 | Zhao | G06Q 10/0637 707/600 |
| 2012/0310916 A1 | 12/2012 | Abadi et al. | |
| 2013/0166535 A1* | 6/2013 | Valentin | G06F 17/30498 707/714 |
| 2014/0280142 A1 | 9/2014 | Wasson et al. | |
| 2014/0282180 A1 | 9/2014 | Orofino | |
| 2014/0304251 A1 | 10/2014 | Bornea et al. | |
| 2015/0095308 A1* | 4/2015 | Kornacker | G06F 17/30448 707/718 |

\* cited by examiner

Segment Layout 850

| | Element | Size | |
|---|---|---|---|
| Block 852-1 | number of elements in block #1 | 8 bytes | Block Header 854-1 |
| | number of bytes in block #1 | 8 bytes | |
| | internal flags for block #1 | 8 bytes | |
| | block #1 data | actual size | |
| | ⋮ | | |
| Block 852-q | number of elements in block #q | 8 bytes | Block Header 854-q |
| | number of bytes in block #q | 8 bytes | |
| | internal flags for block #q | 8 bytes | |
| | block #q data | actual size | |
| Segment Footer 856 | number of elements in block #1 | 8 bytes | Block Header 854-1 |
| | number of bytes in block #1 | 8 bytes | |
| | internal flags for block #1 | 8 bytes | |
| | ⋮ | | |
| | number of elements in block #q | 8 bytes | Block Header 854-q |
| | number of bytes in block #q | 8 bytes | |
| | internal flags for block #q | 8 bytes | |
| | the length of the footer | 8 bytes | |

| | 902 | 904 | 906 | 908 | 910 | 912 |
|---|---|---|---|---|---|---|
| | Row | User | Restaurant | Rating | User Comment | Reply |
| 914 | A | Kate | Artemis Cafe | 5 stars | User Comment A | |
| 916 | B | Joe | PA Square | 2 stars | User Comment B | |
| 918 | C | Kate | PA Square | 1 star | | |
| 920 | D | Maria | Cal Ave Express | 3 stars | User Comment D | |
| 922 | E | Alan | Pizza Panda | 1 star | User Comment E | Reply E |
| 924 | F | Alan | PA Square | 1 star | | |
| 926 | G | Kate | PA Square | 1 star | | |
| 928 | H | Maria | Artemis Cafe | 4 stars | User Comment H | |

SYSTEMS AND METHODS FOR OPERATING A SERVER-SIDE DATA ABSTRACTION LAYER

RELATED APPLICATIONS

This application claims priority to U.S. Provisional Patent Application No. 61/938,126, entitled "Optimizing Parallel Machine Learning for Graphs," filed Feb. 10, 2014, and U.S. Provisional Patent Application No. 62/026,591, entitled "User-Interface for Developing Applications that Apply Machine Learning," filed Jul. 18, 2014, both of which are hereby incorporated by reference in their entirety.

TECHNICAL FIELD

The disclosed implementations relate generally to data structures and more specifically to methods and systems for operating a server-side data abstraction layer.

BACKGROUND

Efficient strategies for data manipulation are increasingly necessary as client devices lack the processing and storage capabilities of larger server computing devices. However, manipulating data on a remote server (or set of servers) creates additional complexities that place a substantial burden on ordinary users. In addition, it is difficult to manipulate data obtained from two or more disparate, non-uniform data sources in an efficient way (e.g. combining data from a local CSV file, a remote SQL transactional database, and a flat file).

SUMMARY

Disclosed implementations address the above deficiencies and other problems associated with efficient data manipulation and parsing.

One approach uses a scalable frame data structure referred to herein as an SFrame. An SFrame is architecturally an immutable, column-store, external memory database with full query capabilities, and high scalability, even on a single machine. As a data structure, an SFrame behaves like a table with multiple columns, where each column is an SArray (a scalable array). Each SArray is a strongly typed immutable array with the capability to support missing values within the array. A "missing value" is sometimes referred to as a NULL value or a NULL.

SFrames are immutable data structures, which can be queried, but not modified. An operation that modifies the data in an SFrame, such as adding a new column or adding a collection of rows, creates a new SFrame and the original SFrame remains unchanged. An SFrame is structured on a column-store basis. In some implementations, each column of an SFrame is stored separately in one or more files. This is unlike traditional databases, which store entire rows in one or more files. This column-store basis permits efficient sub-selection of columns during operations that use only a subset of columns for a respective SArray, avoiding the need to load the remaining columns.

For each SFrame, there are two objects: a server-side SFrame object, with references to server-side SArray objects that store data at the server; and a client-side SFrame object that acts as a proxy for the server-side SFrame object. The underlying data for the SFrame may be stored at a server, but a user can manipulate the data by interacting with the client-side SFrame object locally. Operations and algorithms that transform SFrame data operate at the server, without transmitting data back to the client-side SFrame object. In fact, some implementations spread storage and/or processing operations across many servers in a server system, resulting in even faster execution. The complexity of the server operations are handled by the SFrame architecture, and permit a user to issue commands or write programs or scripts as if the data were stored locally.

In some instances, SFrame objects are used to construct graph objects, which have vertices, edges, properties associated with the vertices, and properties associated with the edges. Like an SFrame, each graph object is really a pair of objects: a client-side graph object and a server-side graph object. The client-side graph object acts as a proxy for the server-side graph object, and the server-side graph object accesses the SFrame data stored at the server. In some implementations, because SFrames handle the disparate data sources, most or all of the graph objects are constructed from SFrame data. The relationship between SFrames and graph objects is many-to-many: a single graph object many be constructed from two or more SFrames, and a single SFrame may be used to construct two or more graph objects.

In accordance with some implementations, a method operates a server-side data abstraction layer. The method is performed at a server system having one or more processors/cores, non-volatile memory, and volatile memory storing one or more programs configured for execution by the one or more processors. The method includes receiving a first request from a first client object at a first client device, where the first request specifies a data source. The method further includes, in response to receiving the first request, uploading data from the specified data source, storing the data as a plurality of first columns in the non-volatile memory, and instantiating a first server object that provides access to the first columns. Each column of the plurality of first columns includes a plurality of data values all having the same data type. In some instances, some of the data values are missing (a "missing" data value is considered to have the same data type as the other non-missing values). The method further includes receiving a second request from the first client object at the first client device, where the second request specifies a transformation of the data. In response to receiving the second request, the method includes storing one or more additional columns in the volatile memory and instantiating a second server object that provides access to the additional columns and one or more of the first columns. Each of the additional columns is constructed from the first columns according to the requested transformation, and each of the additional columns has a plurality of data values all having the same data type (which may have some missing values).

In some implementations, the data source is a CSV file stored on the first client device, a CSV file stored in the non-volatile memory of a server system, a CSV file stored at a remote location specified by a URL, a flat file stored at the first client device, or a result set retrieved from an SQL database using an SQL query. One of skill in the art recognizes that there are many other types of data sources as well, including server-based databases, distributed databases, desktop databases, spreadsheets, and so on.

In some implementations, the method further includes receiving a request from the first client object to read the transformed data. In response to receiving the request to read the transformed data, the method includes retrieving the corresponding additional columns and one or more first columns from the non-volatile storage and transmitting the retrieved additional columns and one or more first columns to the first client device.

In some implementations, the method further includes receiving a request from a client-side graph object at the first client device to use the transformed data, where the request specifies whether to use the transformed data as vertices or edges. In response to receiving the request, the method includes building a server-side graph object corresponding to the client-side graph object. The server-side graph object uses the transformed data, and does not transmit the transformed data to the client-side graph object. The server-side graph object has a set of vertices and a set of edges, where each edge connects a pair of vertices.

In some implementations, each of the first columns is stored as a distinct file (or set of files) in the non-volatile memory, and in some implementations, each of the first columns has the same number N of data values. In some implementations, at least one of the first columns has at least one data value that is missing. In some implementations, the transformation constructs a second column of the additional columns using a formula. For each i in $\{1, 2, \ldots, N\}$, the formula computes the $i^{th}$ data value of the second column using the $i^{th}$ data values of one or more of the first columns.

In some implementations, the server system includes a plurality of servers, each with a one or more processors/cores, non-volatile memory, and volatile memory storing one or more programs configured for execution by the respective one or more processors.

In some implementations, the method further includes receiving a request from a second client object at a second client device to build a corresponding second server object whose data comes from the data source as specified by the first request at the first client device. In some implementations, the method includes determining that the data for the second server object is already stored as the first columns in the non-volatile memory. The method updates metadata for the second server object to access the first columns, thereby providing access to the requested data without re-uploading the data from the specified data source.

Any of the methods described above may be performed by a server system, comprising one or more servers, each having one or more processors/cores, non-volatile memory and volatile memory storing one or more programs configured for execution by the one or more processors/cores. The one or more programs include instructions for performing the various methods.

Any of the methods described above may be performed by one or more programs stored on a computer readable storage medium. The programs are configured for execution by one or more processors/cores of a server system having non-volatile memory and volatile memory. The one or more programs include instructions for performing the various methods.

BRIEF DESCRIPTION OF THE DRAWINGS

For a better understanding of the aforementioned implementations of the invention as well as additional implementations thereof, reference should be made to the Description of Implementations below, in conjunction with the following drawings in which like reference numerals refer to corresponding parts throughout the figures.

FIG. 8B illustrates a physical layout of a segmented SArray according to some implementations.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without these specific details.

DESCRIPTION OF IMPLEMENTATIONS

Figure 1:
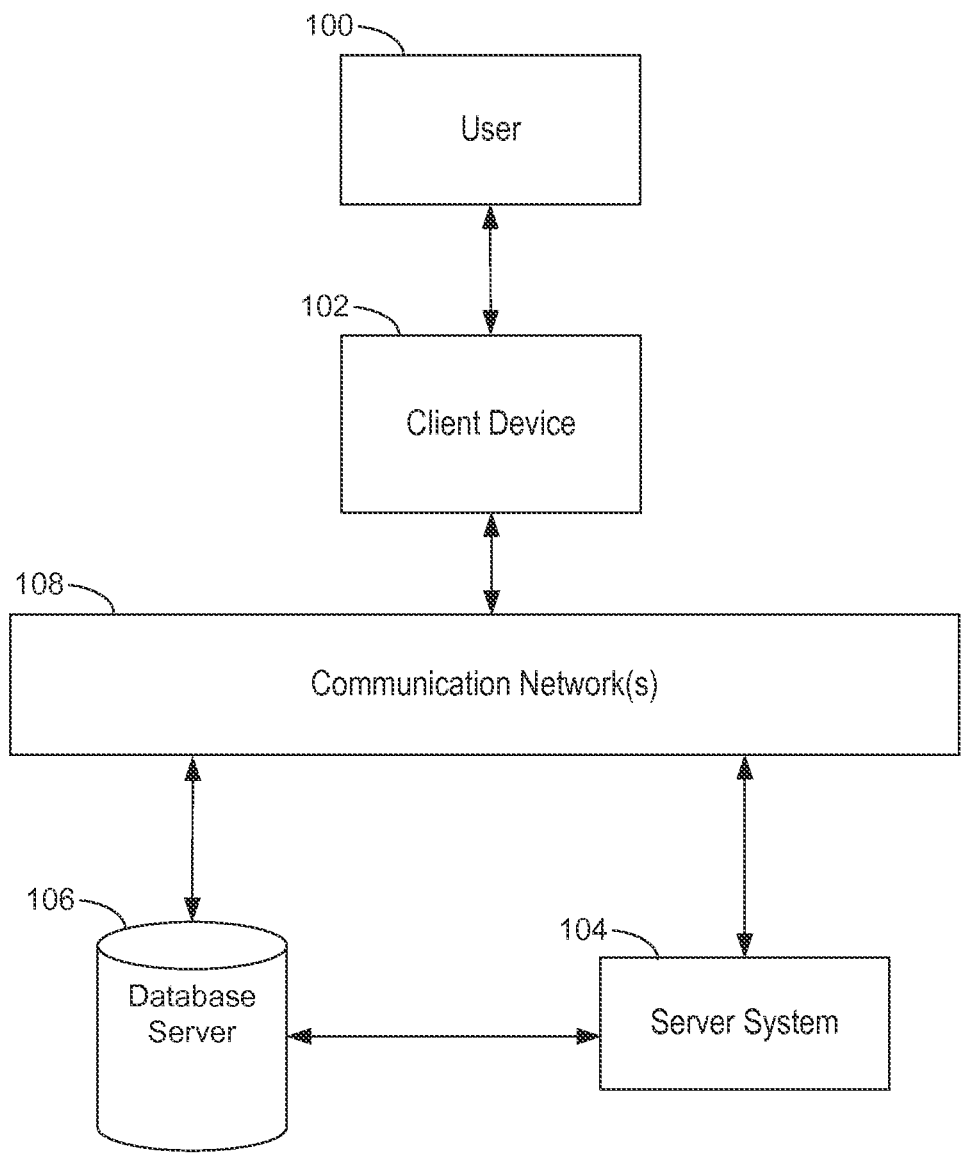
FIG. 1 illustrates conceptually a context in which some implementations operate.

FIG. 1 illustrates conceptually a context in which some implementations operate. FIG. 1 is a block diagram of a client-server environment for operating a server-side data abstraction layer, in accordance with some implementations of the present application. While certain specific features are illustrated, those skilled in the art will appreciate from the present disclosure that various other features have not been illustrated for the sake of brevity and so as not to obscure more pertinent aspects of the implementations disclosed herein. A client-server environment may include one or more Internet service providers (not shown), one or more users 100, one or more client devices 102, one or more server systems 104, one or more database servers 106, and a communication network 108.

In some implementations, Internet service providers provide client devices 102 and the server system 104 access to the communication network 108. For example, a client device 102 such as a laptop computer, tablet computer, desktop computer, smart television, smart phone, or workstation may connect to the communication network 108 through an Internet service provider.

The communication network 108 may be any combination of wired and wireless local area networks (LAN) and/or wide area networks (WAN), such as an intranet, an extranet, including one or more portions of the Internet. The communication network 108 provides communication capability between users 100 of client devices 102 (e.g., smart phones and personal computers) and servers (e.g., a server system 104). In some implementations, the communication network 108 uses the HyperText Transport Protocol (HTTP) to transmit information using the Transmission Control Protocol/Internet Protocol (TCP/IP). HTTP permits a client device to access various resources available via the communication network 108. However, the various implementations described herein are not limited to the use of any particular protocol.

The client-server environment further includes a server system 104. A server system 104 includes one or more server computers 300 (e.g., a network server such as a web server) for receiving and processing data received from the client device 102 (e.g., a request or an identifier of a data source). In some implementations, the server system 104 sends and receives various communications to and from a client device 102. In some implementations, these communications or the information in these communications are stored and retrieved from a database 340, which may be stored at the server system 104 and/or at a separate database server 106. In some implementations, the server system 104 is part of a general data management system.

Those skilled in the art will appreciate from the present disclosure that any number of such devices and/or systems may be provided in a client-server environment. The client-server environment of FIG. 1 is merely an example provided to discuss more pertinent features of the present disclosure. Additional databases and server systems, such as domain name servers may be present in the client-server environment, but have been omitted for ease of explanation.

Figure 2:
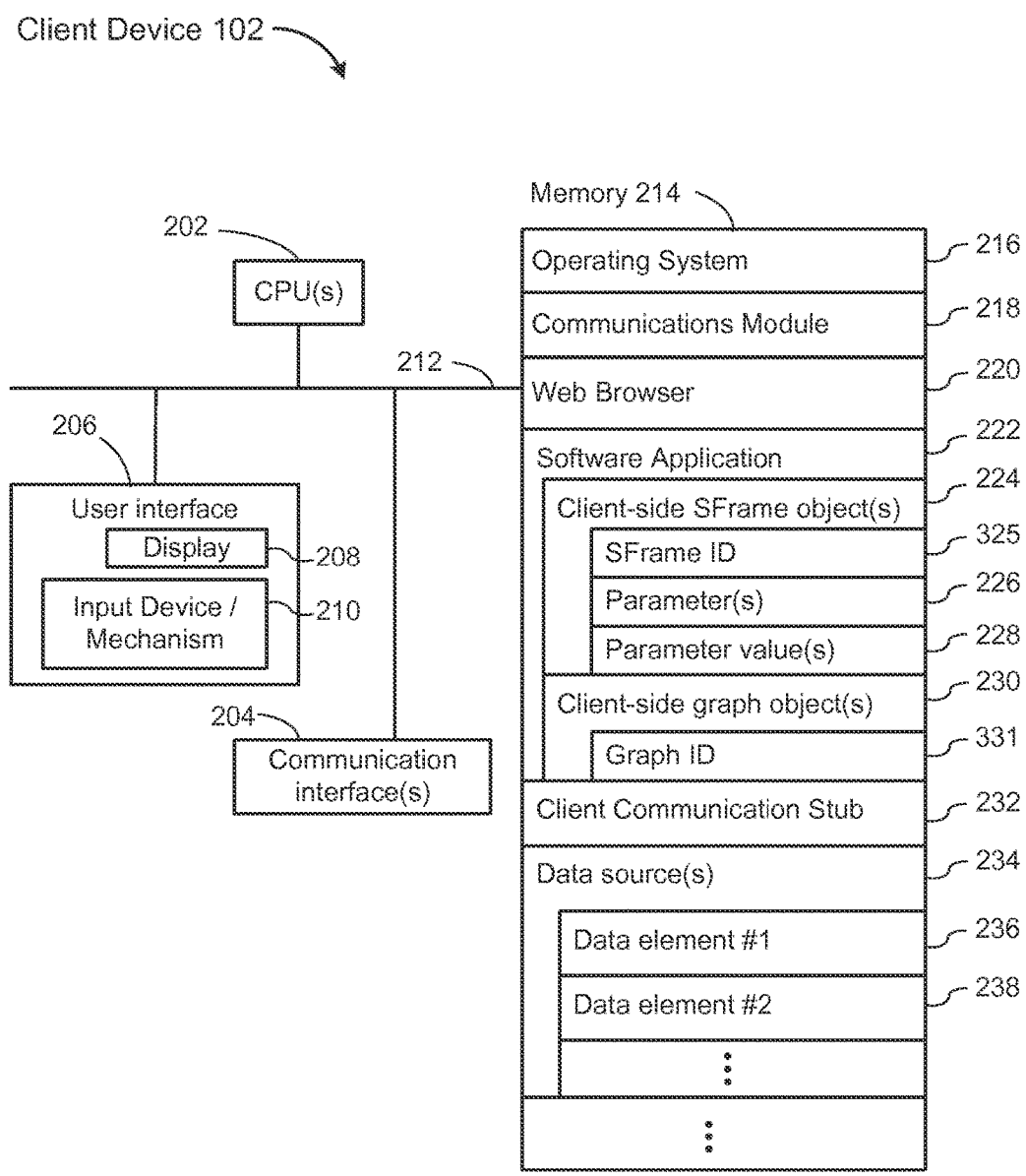
FIG. 2 is a block diagram of a client device according to some implementations.
Figure 4:
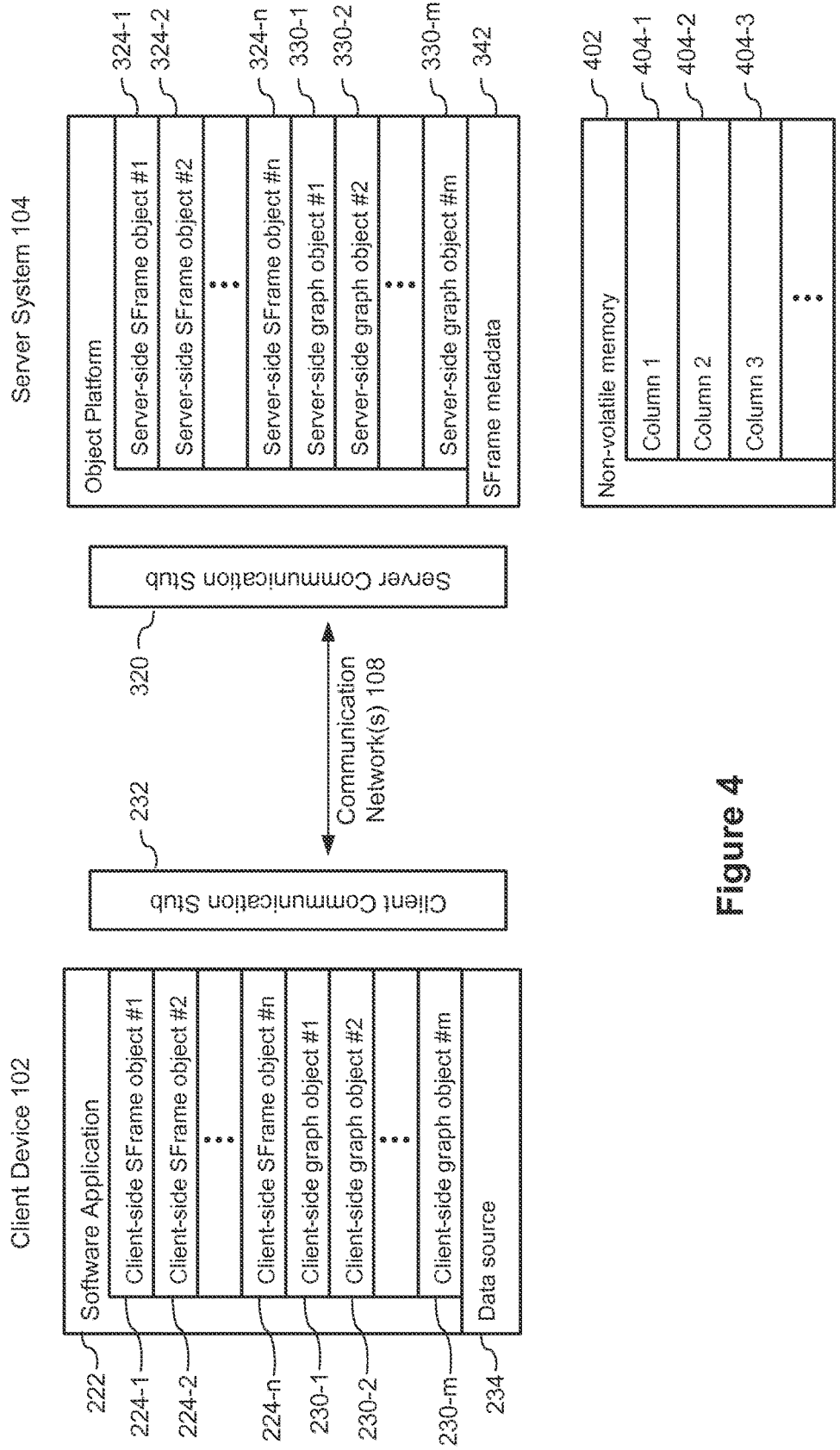
FIG. 4 is a block diagram illustrating the interaction between a client device and a server device according to some implementations.

FIG. 2 is a block diagram illustrating a client device 102 that a user 100 uses to access and use a server-side data abstraction layer in accordance with some disclosed implementations. A client device 102 typically includes one or more processing units/cores (CPUs) 202 for executing modules, programs, and/or instructions stored in memory 214 and thereby performing processing operations; one or more network or other communications interfaces 204; memory 214; and one or more communication buses 212 for interconnecting these components. The communication buses 212 may include circuitry that interconnects and controls communications between system components. A client device 102 includes a user interface 206 including a display device 208 and one or more input devices or mechanisms 210. In some implementations, the input device/mechanism includes a keyboard; in some implementations, the input device/mechanism includes a "soft" keyboard, which is displayed as needed on the display device 208, enabling a user 100 to "press keys" that appear on the display 208. In some implementations, the display 208 and the input device/mechanism 210 comprise a touch screen display (also called a touch sensitive display). In some implementations, the memory 214 includes high-speed random access memory, such as DRAM, SRAM, DDR RAM or other random access solid state memory devices. In some implementations, the memory 214 includes non-volatile memory, such as one or more magnetic disk storage devices, optical disk storage devices, flash memory devices, or other non-volatile solid state storage devices. In some implementations, the memory 214 includes one or more storage devices remotely located from the CPU(s) 202. The memory 214, or alternately the non-volatile memory device(s) within the memory 214, is a computer readable storage medium. In some implementations, the memory 214, or the computer readable storage medium of the memory 214, stores the following programs, modules, and data structures, or a subset thereof:

- an operating system 216, which includes procedures for handling various basic system services and for performing hardware dependent tasks;
- a communications module 218, which is used for connecting the client device 102 to other computers and devices via the one or more communication network interfaces 204 (wired or wireless) and one or more communication networks 108, such as the Internet, other wide area networks, local area networks, metropolitan area networks, and so on;
- a web browser 220 (or other client application), which enables a user 100 to communicate over a network with remote computers or devices;
- a software application 222, which provides the client device with access to various data objects and data structures, such as one or more client-side SFrame objects 224 and one or more client-side graph objects 230. In some implementations, the software application 222 runs in the web browser 220;
- one or more client-side SFrame objects 224, which correspond to server-side SFrame objects 324. Each server-side SFrame object 324 has an SFrame ID 325, which is stored with the corresponding client-side SFrame object 224. Communication between the client-side SFrame object 224 and the corresponding server-side SFrame object 324 uses the SFrame ID 325 to identify the correspondence. Some implementations store additional parameters and corresponding parameter values 228, such as the name or location of the data source for the SFrame;
- one or more client-side graph objects 230, which correspond to server-side graph objects 330. Each server-side graph object 330 has a graph ID 331, which is stored with the corresponding client-side graph object 230. Communication between the client-side graph object 230 and the corresponding server-side graph object 330 uses the graph ID 331 to identify the correspondence. A graph object may be constructed from one or more SFrame objects;
- a client communication stub 232, which communicates with a server communication stub 320, as illustrated in FIG. 4. The client communication stub 232 transmits commands and requests to the server communication stub 320 and receives data or other information from the server communication stub 320; and
- zero or more data sources 234, which may be used to create SFrames. A data source 234 may be a CSV file, an Excel® file, an SQL database, or other source of organized data. Each data source 234 includes one or more data fields, such as data elements 236 and 238.

Each of the above identified executable modules, applications, or set of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 214 may store a subset of the modules and data structures identified above. Furthermore, the memory 214 may store additional modules or data structures not described above.

Although FIG. 2 shows a client device 102, FIG. 2 is intended more as functional description of the various features that may be present rather than as a structural schematic of the implementations described herein. In practice, and as recognized by those of ordinary skill in the art, items shown separately could be combined and some items could be separated.

Figure 3:
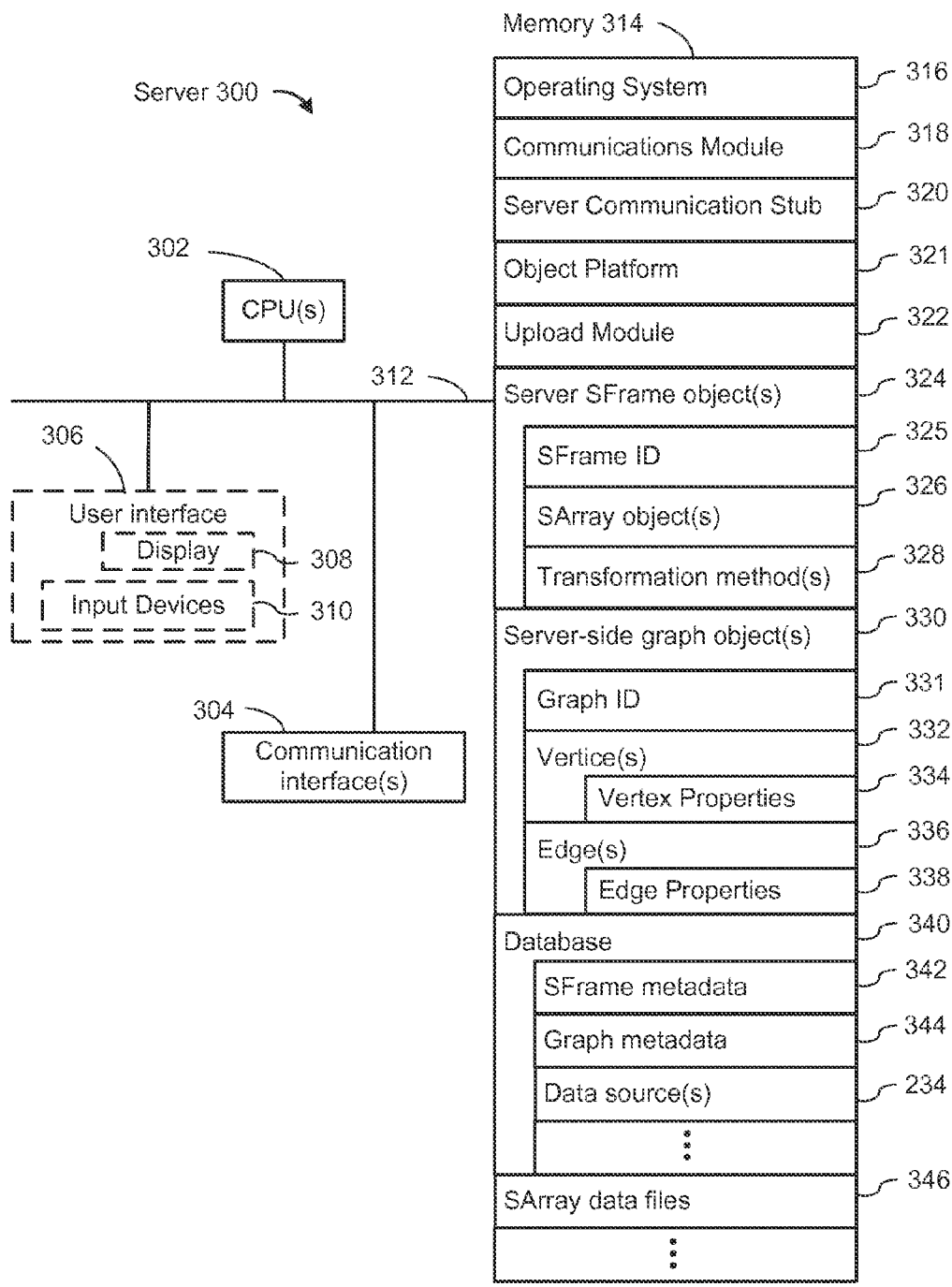
FIG. 3 is a block diagram of a server device according to some implementations.

FIG. 3 is a block diagram of a server 300, which may be included in a server system 104. The server 300 communicates with a client device 102 over a communication network 108, in accordance with some disclosed implementations. A server 300 typically includes one or more processing units/cores (CPU's) 302 for executing modules, programs, and/or instructions stored in memory 314 and thereby performing processing operations; one or more network or other communication interfaces 304; memory 314; and one or more communication buses 312 for interconnecting these components. The communication buses 312 may include circuitry that interconnects and controls communications between system components. The server 300 optionally includes a user interface 306 that includes a display device 308 and one or more input devices or mechanisms 310. In some implementations, the memory 314 includes high-speed random access memory, such as DRAM, SRAM, DDR RAM, or other random access solid state memory devices. In some implementations, the memory 314 includes non-volatile memory, such as one or more magnetic disk storage devices, optical disk storage devices, flash memory devices, or other non-volatile solid state storage devices. In some implementations, the memory 314 includes one or more storage devices remotely located from the CPU(s) 302. The memory 314, or alternately the non-volatile memory device(s) within the memory 314, is a computer readable storage medium. In some implementations, the memory 314, or the computer readable storage medium of memory 314, stores the following programs, modules, and data structures, or a subset thereof:

- an operating system 316, which includes procedures for handling various basic system services and for performing hardware dependent tasks;
- a communications module 318, which is used for connecting the server 300 to other computers and devices via the one or more communication network interfaces 304 (wired or wireless) and one or more communication networks 108, such as the Internet, other wide area networks, local area networks, metropolitan area networks, and so on;
- a server communication stub 320 for receiving commands and requests from a client communication stub 232 and communicating data and information to the client communication stub, as illustrated in FIG. 4;
- an object platform 321, which defines a set of interrelated object classes, and enables instantiation of objects according to the object classes. For example, the object platform 321 includes class definitions for SFrame objects 324, SArray objects 326, and graph objects 330, as well as ancillary objects used by these objects. In some implementations the object platform tracks what objects have been instantiated and tracks references to each instantiated object (e.g., what client devices have active client-side objects corresponding to the instantiated server-side objects);
- an upload module 322, which uploads and transforms data from various data sources. In some implementations, the upload module 322 is included in SFrame or SArray objects. In some implementations, the upload module 322 transforms uploaded data into a standardized format for storage in one or more SArrays. In some instances, the upload module 322 receives data from a client device in a format identified in the request (e.g., a CSV file with headers or a CSV file without headers). The designated format may specify data types for the fields, such as specifying that the first field in a CSV file is an integer and the second field is a date. In some instances, the upload module 322 retrieves data from an external source (e.g., at a designated URL) or from a data source 234 stored at the server. In some instances, retrieving data includes transmitting a query to a database management system (DBMS), such as an SQL database system;
- one or more server-side SFrame objects 324, which are identified by unique SFrame IDs 325. Each SFrame object includes one or more SArray objects 326, which include references to stored columns of data. In some implementations, the data is stored as illustrated in FIGS. 5-8B. In some implementations, an SFrame object includes transformation methods 328. The transformation methods include elementary unary operations (e.g., computing a Boolean value that indicates whether numeric entries in the third column are greater than 5.0) and binary operations (e.g., concatenating the strings in the fourth and fifth columns), as well as more complex expressions using data fields as well as literal values. Because SFrames and SArrays are immutable, a transformation creates new SFrames and SArrays. In some implementations, the transformation methods are implemented in whole or in part by the object platform 321;
- zero or more server-side graph objects 330, which may be constructed from one or more server-side SFrame objects 324. Each graph object 330 has a graph ID 331, vertices 332, and edges 336. Each vertex 332 has zero or more vertex properties 334, where each property 334 includes both a property name and a property value (which may be a missing value). In some implementations, each vertex property 334 specifies a data type, and the property values correspond to that data type. Similarly, each edge 336 has zero or more edge properties 338. In some instances, two or more vertices share a common property. For example, if the vertices represent people, each vertex may have a "name" property. Similarly, edges may share a common property;
- zero or more databases 340. In some implementations, one or more of the databases 340 are SQL databases. In some implementations, one or more of the database 340 are organized collections of data stored in one or more files (e.g., a flat file or a CSV file). In some implementations, the database 340 stores SFrame metadata 342 and graph metadata 344. In some implementations, the metadata 342 and 344 includes the SFrame IDs 325 and graph IDs 331. In some implementations, the metadata 342 and 344 specifies when objects were created, how they were transformed over time, who requested the objects, the data sources, and so on. In some implementations, the databases 340 store one or more data sources 234. In some implementations, the SFrame metadata 342 includes information for one or more server-side SFrame objects 324, such as data sources, applicable columns of a respective data source (e.g., SArray objects), data types, reference counters (e.g., which users have accessed or viewed the SFrame object), the locations of data on disk, pointers for ancestry of transformations, (e.g., the SArray objects or data columns that an SFrame object was derived from), and predefined statistics (e.g., data quantiles). In some implementations, one or more of the databases 340 are stored at an external database server 106; and
- SArray data files 346, which store the underlying data for each SArray 326. Some example formats for the data files are illustrated in FIGS. 5-8B.

Each of the above identified executable modules, applications, or set of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 314 stores a subset of the modules and data structures identified above. Furthermore, the memory 314 may store additional modules or data structures not described above.

Although FIG. 3 shows a server 300, FIG. 3 is intended more as a functional description of the various features that may be present rather than as a structural schematic of the implementations described herein. In practice, and as recognized by those of ordinary skill in the art, items shown separately could be combined and some items could be separated.

FIG. 4 is a block diagram illustrating the interaction between a client device 102 and a server system 104. A user or program at the client device 102 interacts with client-side objects, and those interactions are translated into server-side commands and requests through the client stub 232/server stub 320 connection. In some implementations, the data structures, modules, applications, or procedures for the client device 102 reside in memory 214, as shown in FIG. 2. In some implementations, the client device 102 includes a software application 222 that manages various client-side data objects such as client-side SFrame objects 224 and client-side graph objects 230. In some implementations, the application 222 runs within a browser 220. In some implementations, the application 222 is a browser plug-in. In some implementations, the software application 222 is written in one or more of Java, C++, Python, PHP, Ruby, or SQL. In some implementations, some or all of the software application 222 is custom-written by a user 100 at the client device 102. In some implementations, the software application 222 is written by another user or entity. For example, in some implementations the software application 222 is written by a commercial software developer or an entity corresponding to the server system 104.

FIG. 4 illustrates creating a sequence of SFrames objects. A user constructs an initial SFrame object #1, and specifies a data source 234. This creates the client side SFrame object 224-1 and the corresponding server-side SFrame object 324-1. In some implementations, the data for the SFrame object is specified during instantiation. In other implementations, the SFrame object may be created initially as an "empty" object, with data added later. Some implementations support both approaches. In some implementations, an SFrame object that is initially empty does not become immutable until it has some data. The data source 234 for the new SFrame 224-1/324-1 may be on the client device, stored at the server system 104, or may exist at an external site or device (e.g., on a corporate server where the client device is used). The data source 234 may be in various formats, such as a CSV file, a spreadsheet, an SQL database, a Hive database, and so on. In some implementations, if the data source does not specify field names or data types for the fields, a user may specify field names or data types. In some implementations, default field names (e.g., "Field1", "Field2", . . . ) are assigned if the field names are not specified in the data source and not specified by the user as part of creating the SFrame. Similarly, some implementations infer data types when they are not explicitly specified by the data source or by the user.

FIG. 4 illustrates applying n−1 transformations to the original SFrame, creating new client-side SFrame objects 224-2, . . . , 224-n and server-side SFrame objects 324-2, . . . , 324-n. Implementations typically support a wide variety of transformations. The transformations include adding new rows (e.g., appending from another data source), adding additional columns (e.g., importing from another data source or using a formula that computes new values based on the existing columns), removing rows or columns, or "modifying" an existing column. Because SFrames are immutable, each transformation creates a new SFrame, without modifying the existing SFrame. Formulas for new or modified columns can use complex expressions that include numeric functions, string functions, comparison operators, Boolean operators, date functions, and so on. In some implementations, each of the server-side objects in the sequence 324-1 to 324-n uses the same SFrame ID 325, and uses version or sequence numbers to distinguish them. In other implementations, each of the SFrame objects has a distinct SFrame ID 325. In implementations that use version numbers, when reading data from an SFrame the default is to use the current version number unless the request from the client specifies the version number.

In some implementations, the data for SFrame object #n 324-n is stored as columns in non-volatile memory 402 (e.g., a hard disk or solid state memory). For example, the data may be stored in columns 404-1, 404-2, and 404-3, each corresponding to an SArray. Information about SFrames and SArrays may be stored in the SFrame metadata 342.

In some implementations, the sequence of transformations identified in FIG. 4 result in new server-side SFrame objects 324, but there is a single associated client-side SFrame object 224. In some of these implementations, when a transformation is applied, the new SFrame ID 325 of the new SFrame object 324 is returned to the client-side SFrame object 224. In other implementations, each new SFrame object uses the same SFrame ID 325, but has a new version number, so the new version number is returned to the client-side SFrame object.

One use of SFrames is to build graph objects. In some implementations, the complexity of data sources is handled by SFrames, and thus graph objects can use SFrames as the standard format for source data. For example, in FIG. 4, the SFrame 224-1/324-1 was uploaded, and went through a sequence of n−1 transformations. The first graph object 230-1/330-1 may be constructed based on the $n^{th}$ SFrame 224-n/324-n (or based on any of the intermediate SFrame objects). In some implementations, a server-side graph object 330 uses the SFrame data directly, without making a new copy of the data. For example, the server side graph object 330-1 may access the columns 404-1, 404-2, and 404-3 stored in non-volatile memory. In some implementations, when a graph object is created, a copy of the data from the SFrame is made.

Like SFrame objects, some implementations allow graph objects to be transformed, and each transformation results in a new graph instance, as illustrated in FIG. 4. In this illustration, the original graph object 230-1/330-1 goes through a sequence of m−1 transformations, with intermediate graph objects 230-2/330-2, . . . , 230-m/330-m. For graphs, the transformations can add or remove vertices 332, add or remove edges 336 between vertices, add or remove vertex properties 334, or add or remove edge properties 338.

Figure 5:
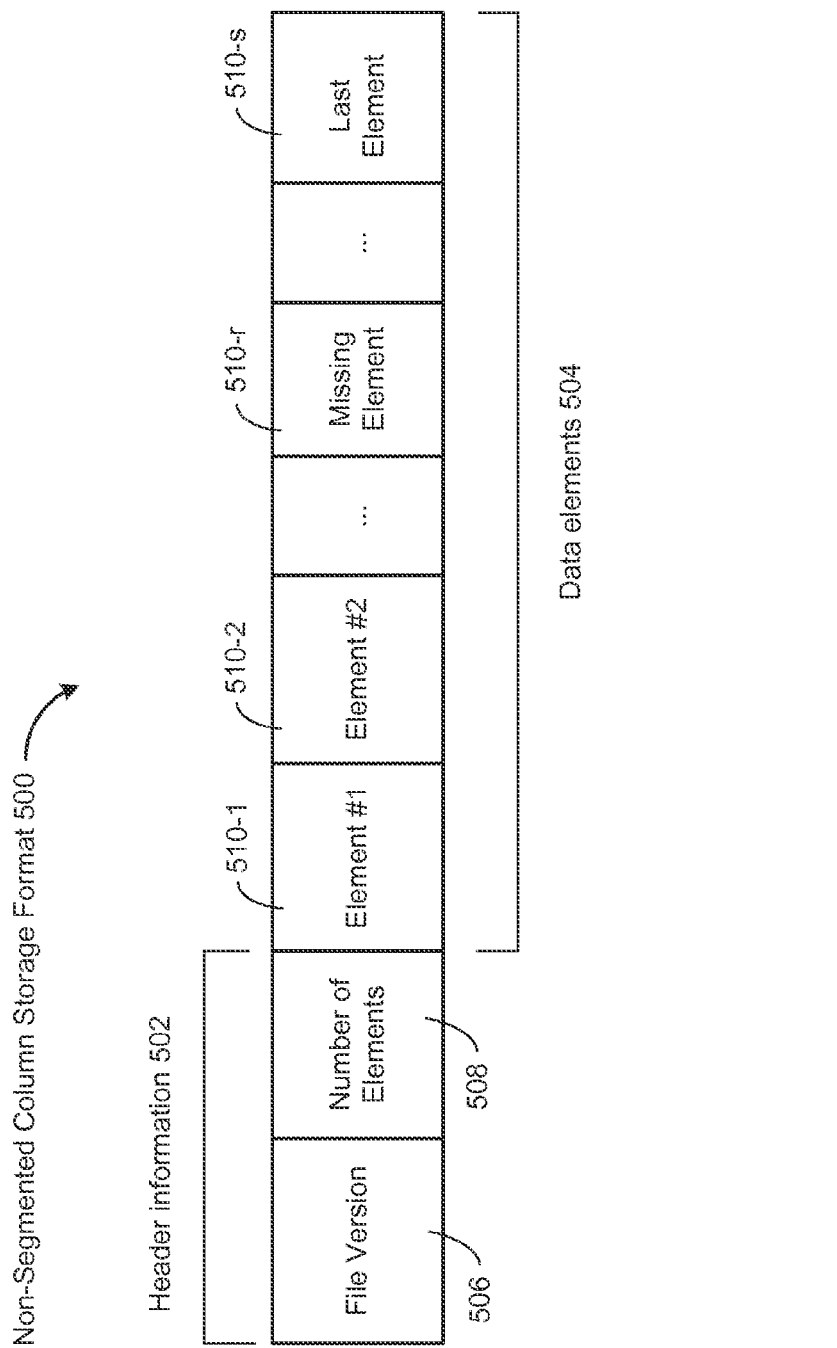
FIG. 5 illustrates a column storage format of a scalable array (SArray), according to some implementations.

FIG. 5 illustrates a non-segmented column storage format 500 for an SArray according to some implementations. Data from a data source 234 (e.g., a CSV file located on an external server) is retrieved, and then organized by the server system 104 into one or more column-based data structures, where all of the data elements in each column have the same data type (e.g., Boolean, char, string, 32-bit integer, 64 bit integer, single precision floating point, or double precision floating point). Each column-based data structure is a separate SArray. Each SArray is an immutable column of data elements. In some implementations, an SArray is stored as one or more files in memory.

The SArray format 500 includes header information 502 and data elements 504. The header information includes metadata about the SArray, such as the file version 506, the number 508 of data elements in the SArray, the data type of the elements in the SArray, the size of each data element, or the size of the SArray (e.g., in bytes). In some implementations, the header information 502 includes certain required information, such as the number of elements in the SArray, and other optional information. As illustrated in FIG. 5, the data element portion 504 includes the actual data values 510-1, 510-2, . . . , 510-s stored in the SArray. In some implementations, each of the data elements 510 has the same size, and thus the location of each data element can be computed by multiplying the size by the number of the data element. Some implementations support variable size data elements (e.g., variable length strings).

In some instances, an SArray includes one or more missing elements 510-r, which are sometimes referred to as NULLs or NULL values. For example, for an SFrame storing data about people, one of the SArrays may store the gender of each person. However, for some people that information may not be known. In some implementations, a default value is substituted to prevent missing values, such as an empty string or the value 0.

Figure 6:
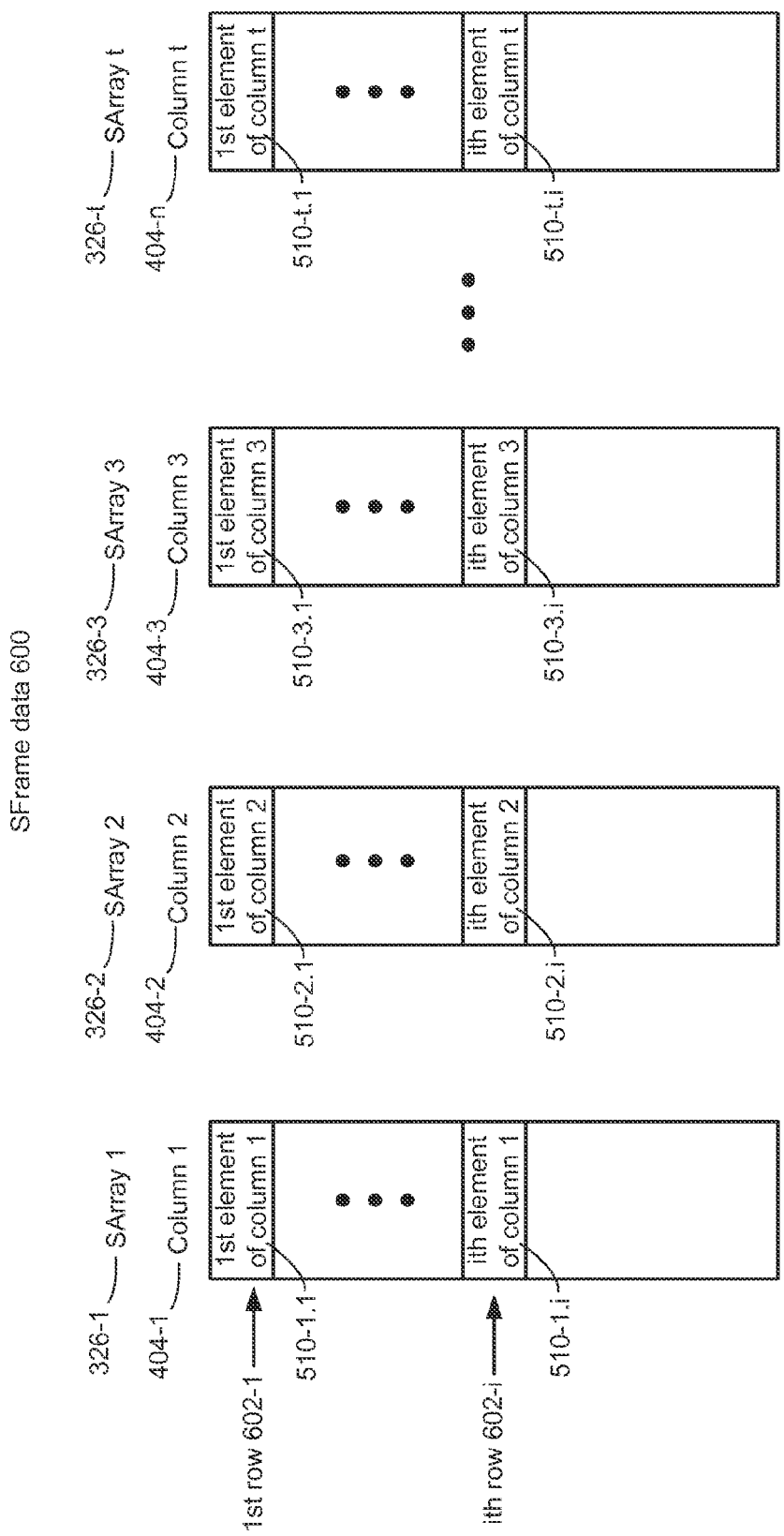
FIG. 6 illustrates several SArrays according to some implementations.

FIG. 6 illustrates SFrame data 600. Each SFrame object includes one or more SArray objects 326-1, 326-2, 326-3, . . . , 326-t. Each SArray object 326 has corresponding data 404, such as columns 404-1, 404-2, 404-3, . . . , 404-t, which are stored as columns of values. In some implementations, the columns are stored using the format illustrated in FIG. 5. Some implementations use a segmented layout for storage of the columns 404, as illustrated in FIG. 8B.

Although an SFrame object includes a set of SArray objects, and each SArray has data stored as a column, it is still meaningful to refer to rows of data in an SFrame. A row of data consists of corresponding elements in each of the columns. For example, the first row 602-1 consists of the first elements in each of the columns, including the first element 510-1.1 of the first column, the first element 510-2.1 of the second column, the first element 510-3.1 of the third column, and so on, up to the first row 510-t.1 of the $t^{th}$ column. In general, for any positive integer i (up to the number of data elements in each column), the $i^{th}$ row 602-$i$ consists of the $i^{th}$ element 510-1.$i$ of the first column, the $i^{th}$ element 510-2.$i$ of the second column, the $i^{th}$ element 510-3.$i$ of the third column, and so on, up to the $i^{th}$ element 510-t.$i$ of the $t^{th}$ column. Typically, each of the columns within a single SFrame has the same number of elements, so the last row of the SFrame consists of the last element in each of the columns. Note that a missing element in a column is still a data element (e.g., there is allocated physical storage space), so missing elements do not alter the definition of a row.

Figure 7:
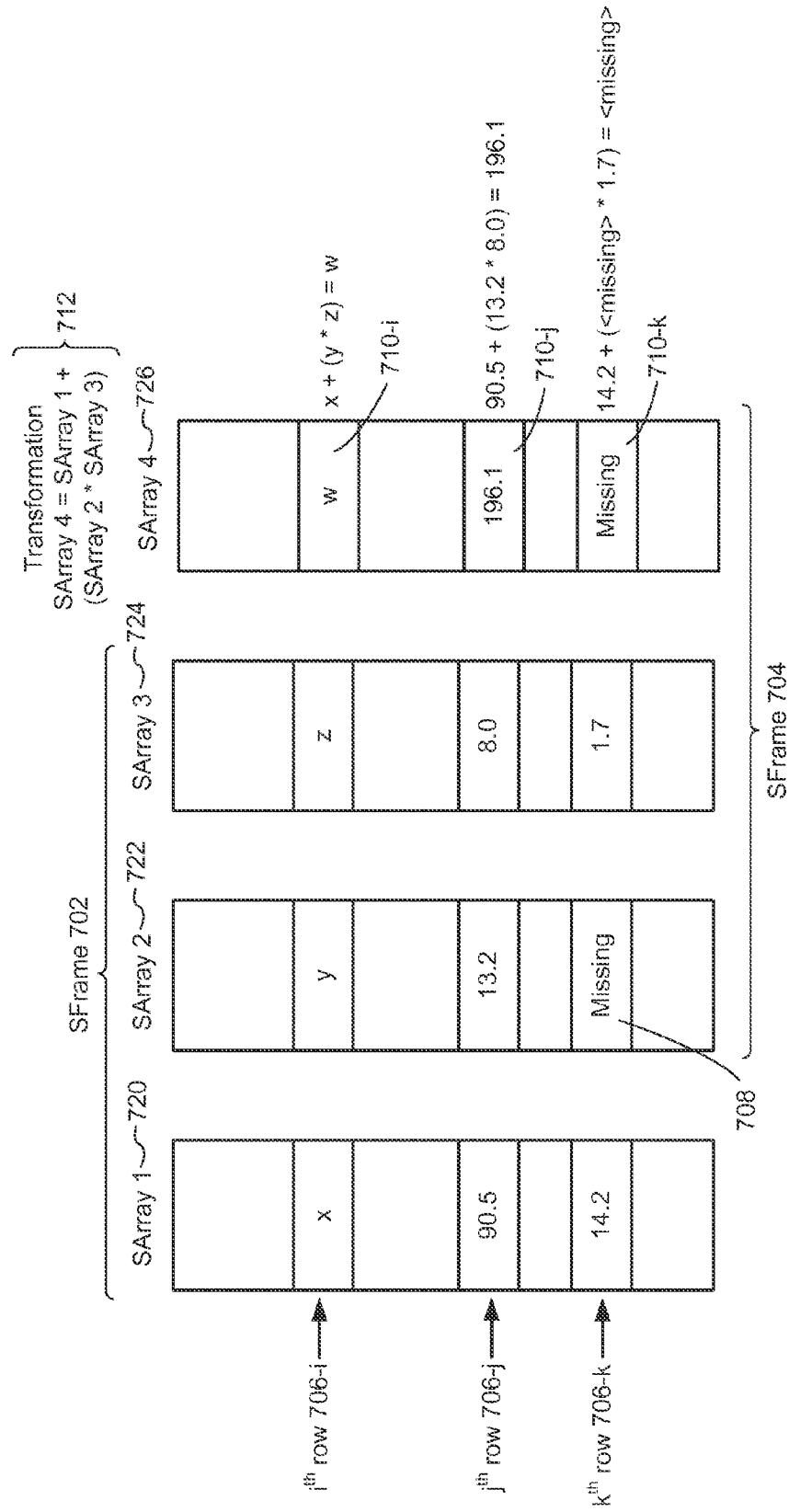
FIG. 7 illustrates how SArrays may be used in scalable frames (SFrames) according to some implementations.

FIG. 7 illustrates how SArrays may be used in scalable frames (SFrames) according to some implementations. FIG. 7 illustrates two distinct SFrames 702 and 704, but the two SFrames share some of the SArrays. Note that FIG. 7 illustrates the underlying data stored for each SArray, and does not illustrate the other properties and methods of the SArray objects. In this illustration, the first SFrame 702 includes the first three SArrays 720, 722, and 724, and the second SFrame 704 includes the last three SArrays 722, 724, and 726. The SArrays may have many rows (e.g., millions). For illustration, the data for the $i^{th}$ row 706-$i$, the $i^{th}$ row 706-$j$, and the $k^{th}$ row 706-$k$ are shown.

In this example, the second SFrame 704 is derived from the first SFrame 702 by applying a transformation 712. In this example, the data elements in the fourth SArray 726 are computed from the data values in the first three SArrays 720, 722, and 724 using an arithmetic expression, but transformations may use many other formulas or expressions as well. For example, in addition to applying arithmetic functions, transformations can round values, convert data elements from one type to another (e.g., float to int), filter out values within a certain range, perform comparisons, apply Boolean expressions, apply date functions, apply string functions such as concatenation or extraction of substrings, and so on.

The ith row 706-$i$ illustrates how the value 710-$i$ in the fourth SArray 726 is computed from the values in the first three SArrays 720, 722, and 724. Using the formula 712, the value 710-$i$ in the fourth SArray 726 is computed as $x+(y*z)$, where x is the value for the first SArray 720, y is the value for the second SArray 722, and z is the value for the third SArray 724. The $j^{th}$ row 706-$j$ illustrates the calculation applied to specific data values to compute the value 710-$j$ for the fourth SArray 710-$j$. The $k^{th}$ row 706-$k$ illustrates what occurs when one or more data values is missing. Because the data value 708 for the $k^{th}$ row of the second SArray 722 is missing, the formula 712 produces a missing value 710-$k$ for the fourth SArray 726. If any of the data values used by a formula are missing, the result is a missing value. In some implementations, a user may specify a default value for the result if any of the input values are missing (e.g., set the result of an arithmetic calculation to be 0 if any of the input values are missing). When an aggregate calculation is performed (e.g., computing an average), some implementations allow a user to specify that missing values are ignored. Some implementations provide functions to give users greater control for handling missing values. For example, some implementations provide a binary ISMISSING( ) function where the first argument is a variable representing a column, and the second argument is the substitute value to use when the value of the first argument is missing.

In some implementations, at least a portion of a respective SFrame or SArray is stored in cache memory. In some implementations, this allows for fast retrieval of a respective SFrame or SArray by one or more users of the server, acting as a group-wide cached memory (e.g., a company or department-wide cached memory).

In some implementations, SFrames or SArrays are accessible to users other than the one who created them. The SFrame metadata 342 indicates the data source as well as the transformations that have been applied, so if another user wants to create an SFrame whose data already exists, the data need not be re-uploaded or re-transformed. For example, if another user wants an SFrame that includes the data from the first SArray 720 and the fourth SArray 726, the "new" SFrame can be created by pointing to the existing data for these two SArrays. This can be particularly useful in an environment where multiple people are accessing the same data, especially when the data set is large (e.g., millions or hundreds of millions of records).

Figure 8A:
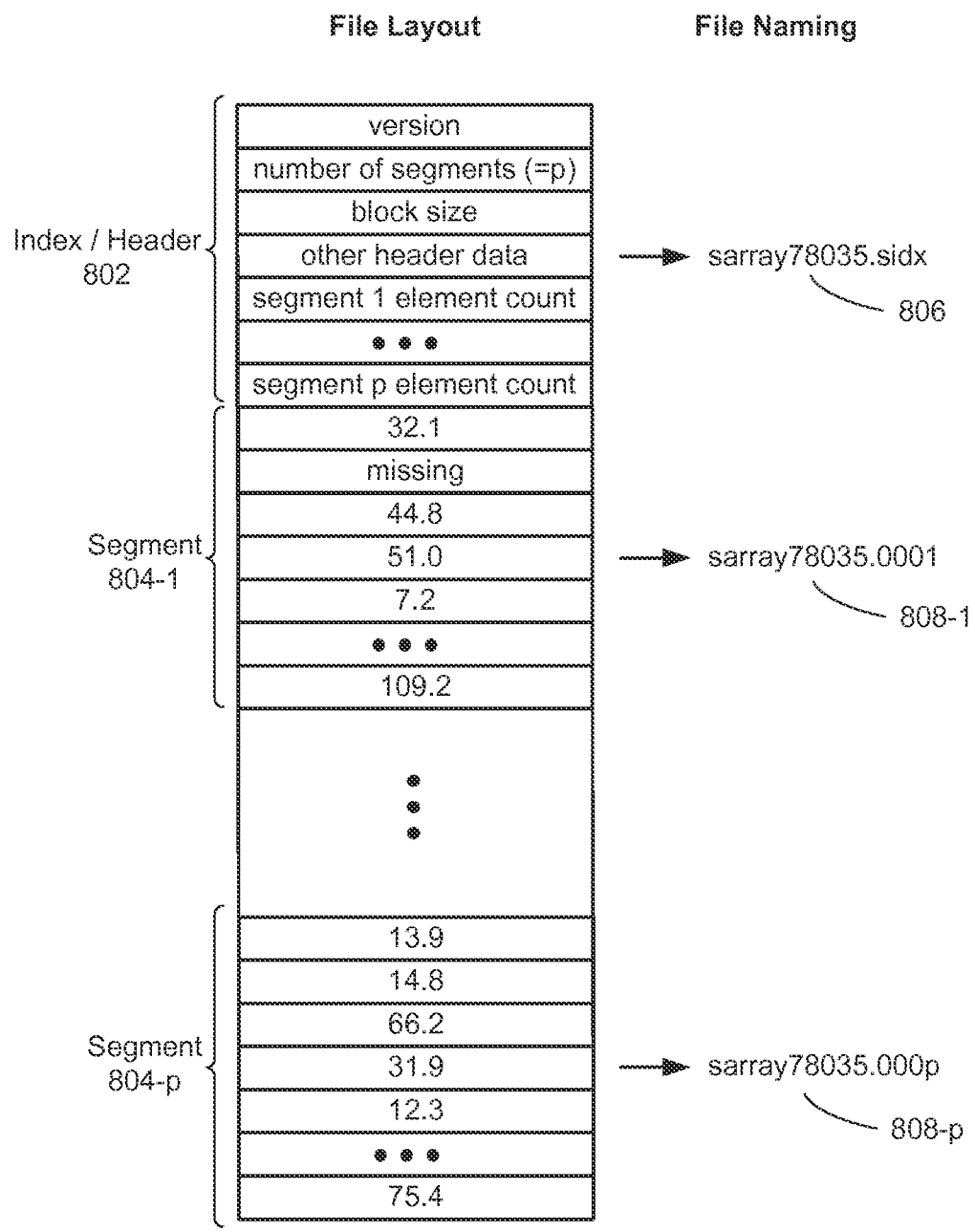
FIG. 8A illustrates a physical layout of an SArray according to some implementations.

FIG. 8A illustrates an alternative physical layout of an SArray according to some implementations. In this format, the data values for the SArray are placed into segments. The SArray includes an index file and one or more data segment files, which are typically all stored on the same directory. Some implementations use file naming conventions to indicate which files are grouped together. For example, in some implementations, the index file 806 and each of the segment files 808-1, . . . , 808-p have the same base file name, and use different file extensions to indicate the roles. For example, some implementations use the file extension "sidx" for the index file and numeric strings such as "0001," "0002," . . . , "000p" for the segments, numbered in order, where p is the number of segments. If p is greater than 9, the extension is formatted accordingly (e.g., if there are 149 segments, then the last segment has extension "0149"). In some implementations, the segment numbers start with "0000" for the first segment. In some implementations, the file names are correlated based on metadata stored elsewhere, such as the database 340.

The index file 806 includes header information 802, which is metadata about the SArray. In some implementations, the header 802 includes a version number. Different header versions may include different data or have different amounts of space allocated for the header fields. In some implementations, the header includes a field that specifies the number of segments for the SArray. In some implementations, each data segment 804 is further subdivided into blocks, as illustrated below in FIG. 8B. Some of these implementations specify the block size in the header 802. Some implementations included additional header data in the header 802. In some implementations, there is a fixed number of data elements in each of the segments 804, or a fixed maximum number of data elements, which is included in the header 802. Because different data types require different amounts of storage, the number of data elements in each segment may differ between columns. In some implementations, the last portion of the header 802 specifies the number of data elements in each of the segments. For this reason, a header file 806 is typically not a fixed size.

As illustrated in FIG. 8A, each segment 804 is stored as a separate data file 808. The segments store the underlying data for the SArray. Typically, the data elements within an SArray have fixed sizes, which makes it easy to locate individual data elements. As illustrated in FIG. 8A, some of the data elements may be missing.

In some implementations, each segment 808 is further subdivided into blocks 852, as illustrated in FIG. 8B. In some implementations, each block 852 includes a block header 854, which typically has a fixed size, and then the block content. In some implementations, the size of each block (which may include or exclude the header depending on the implementation) is specified in the header file 806. In some implementations, the block header 854 for each block specifies the number of elements in the block, the size of the block (e.g., in bytes), and other internal flags. Typically, each data element is stored entirely within a single block, and not split across blocks. In some implementations, each segment includes a segment footer 856. In some implementations, the segment footer 856 includes each of the block headers 854-1, . . . , 854-q. In some implementations, the length of the footer itself is specified as the last field in the segment footer 856.

Figures 9A, 9B:
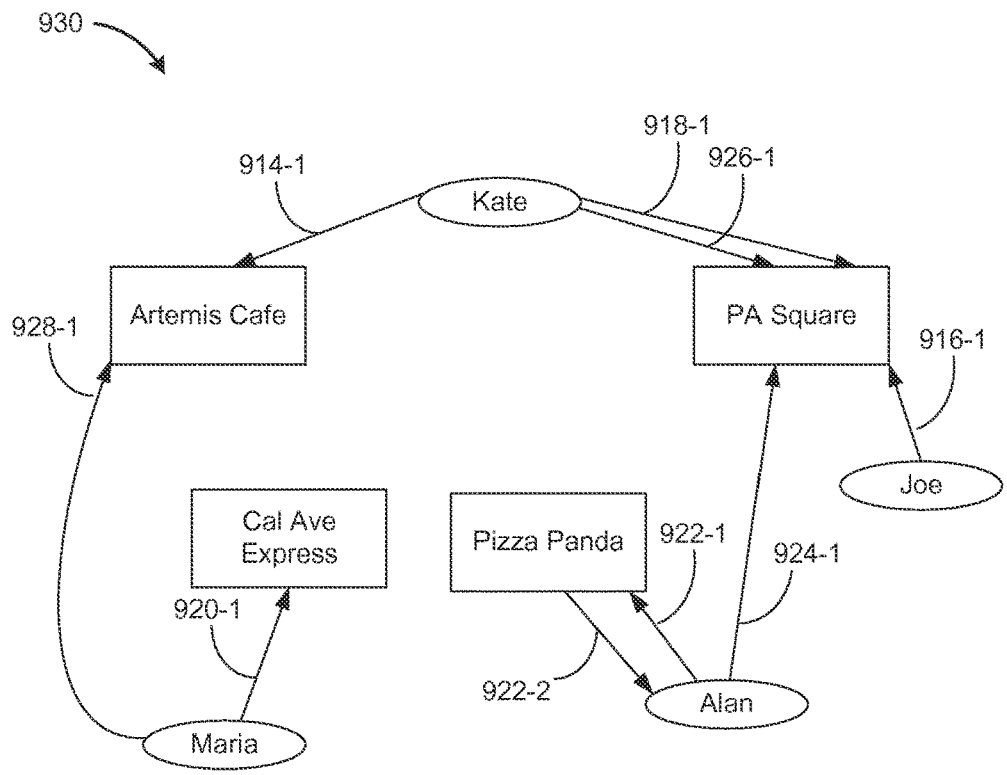
FIG. 9A provides an abbreviated table of data that may be stored as an SFrame, according to some implementations.
FIG. 9B is a graphical representation of the data provided in FIG. 9A according to some implementations.
Figure 10A:
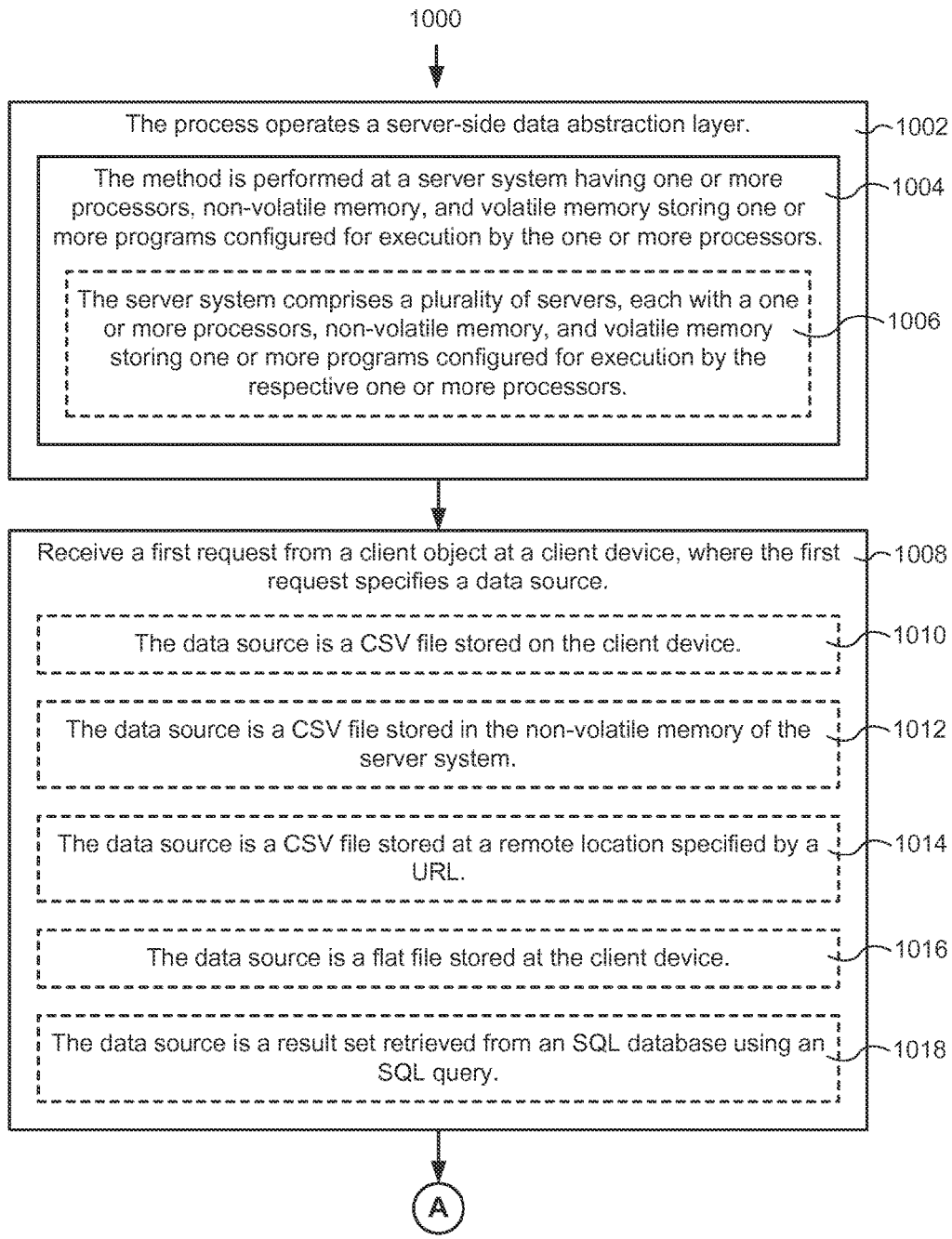
FIGS. 10A-10D provide a flowchart of a process, performed at a server system, for operating a server-side data abstraction layer according to some implementations.
Figure 10B:
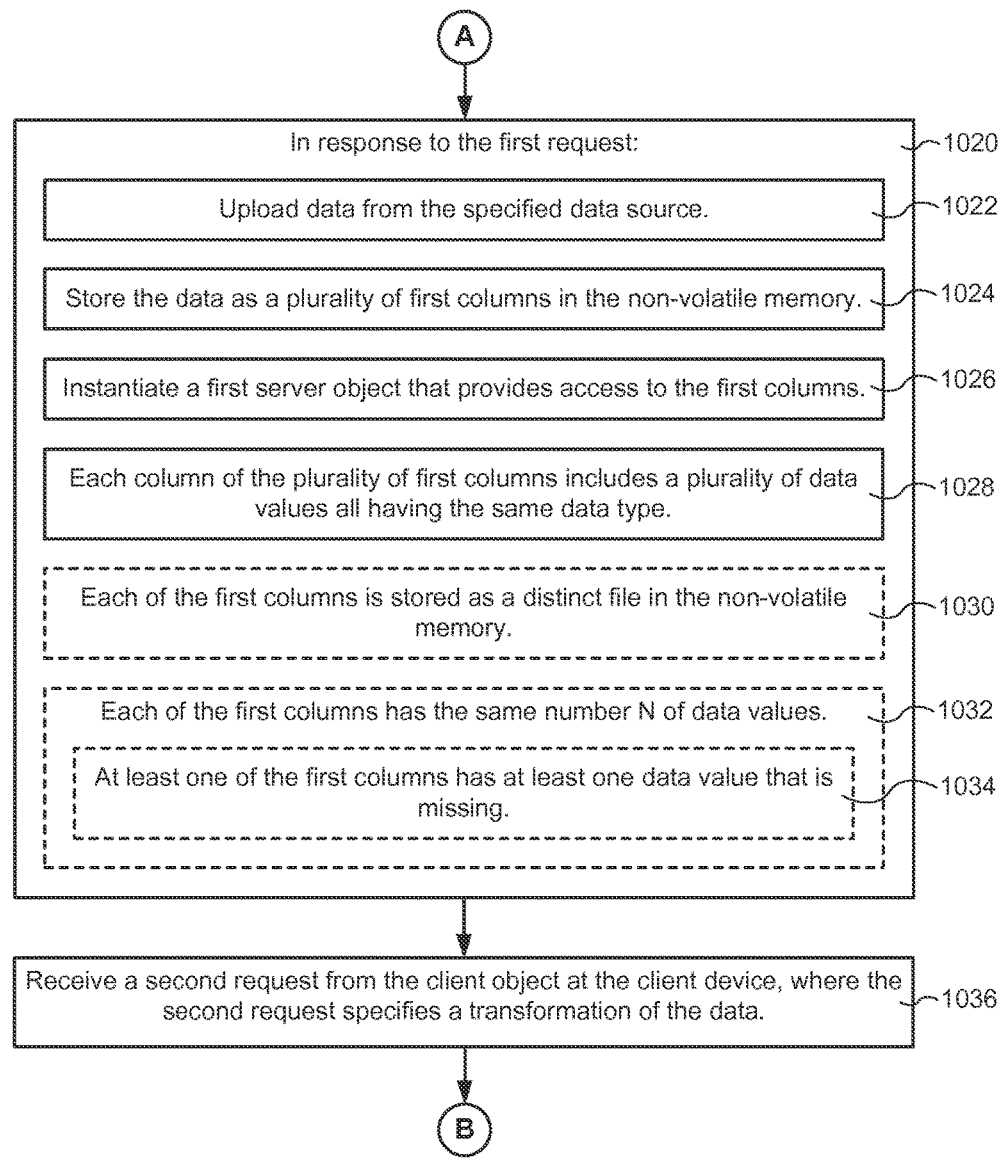
Figure 10C:
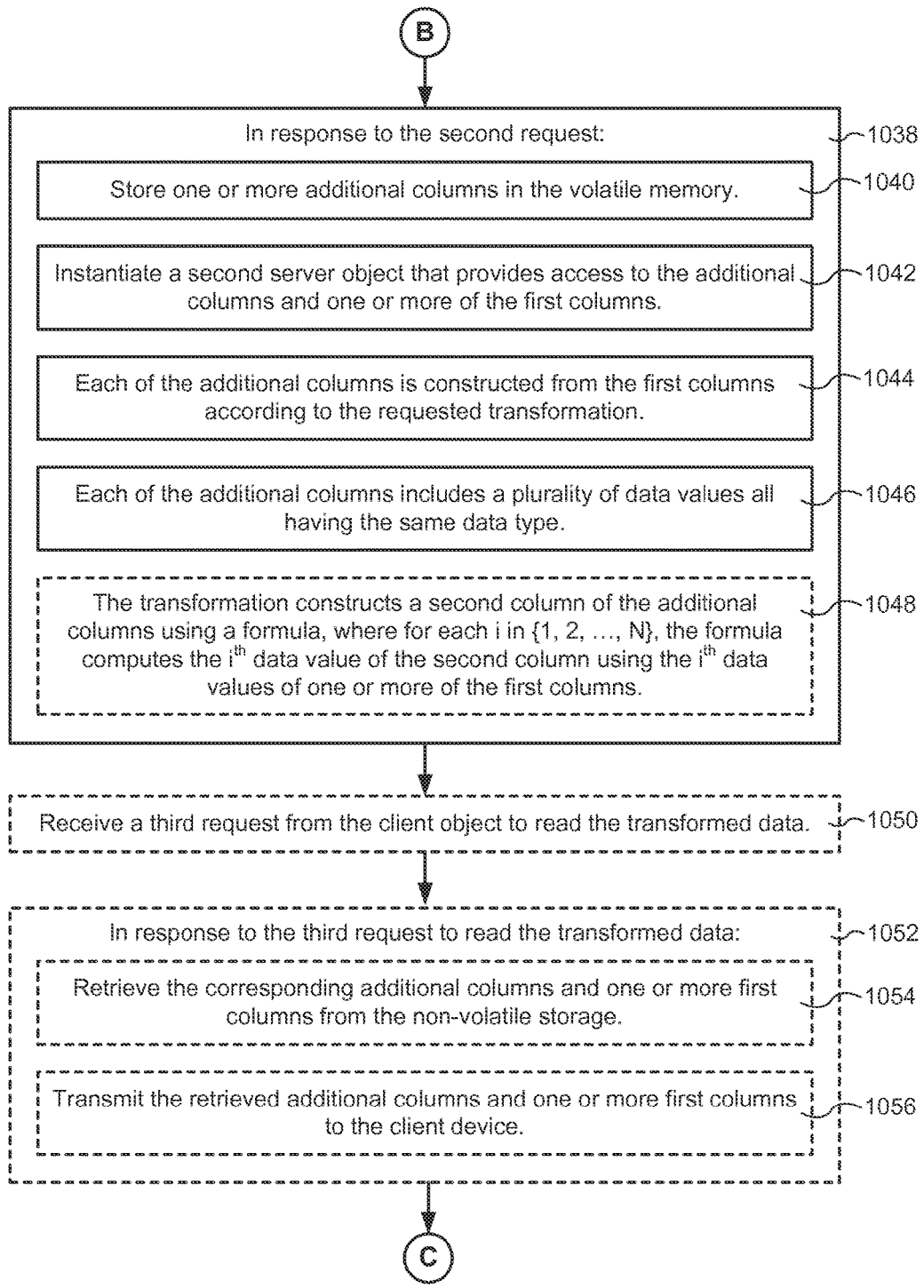
Figure 10D:
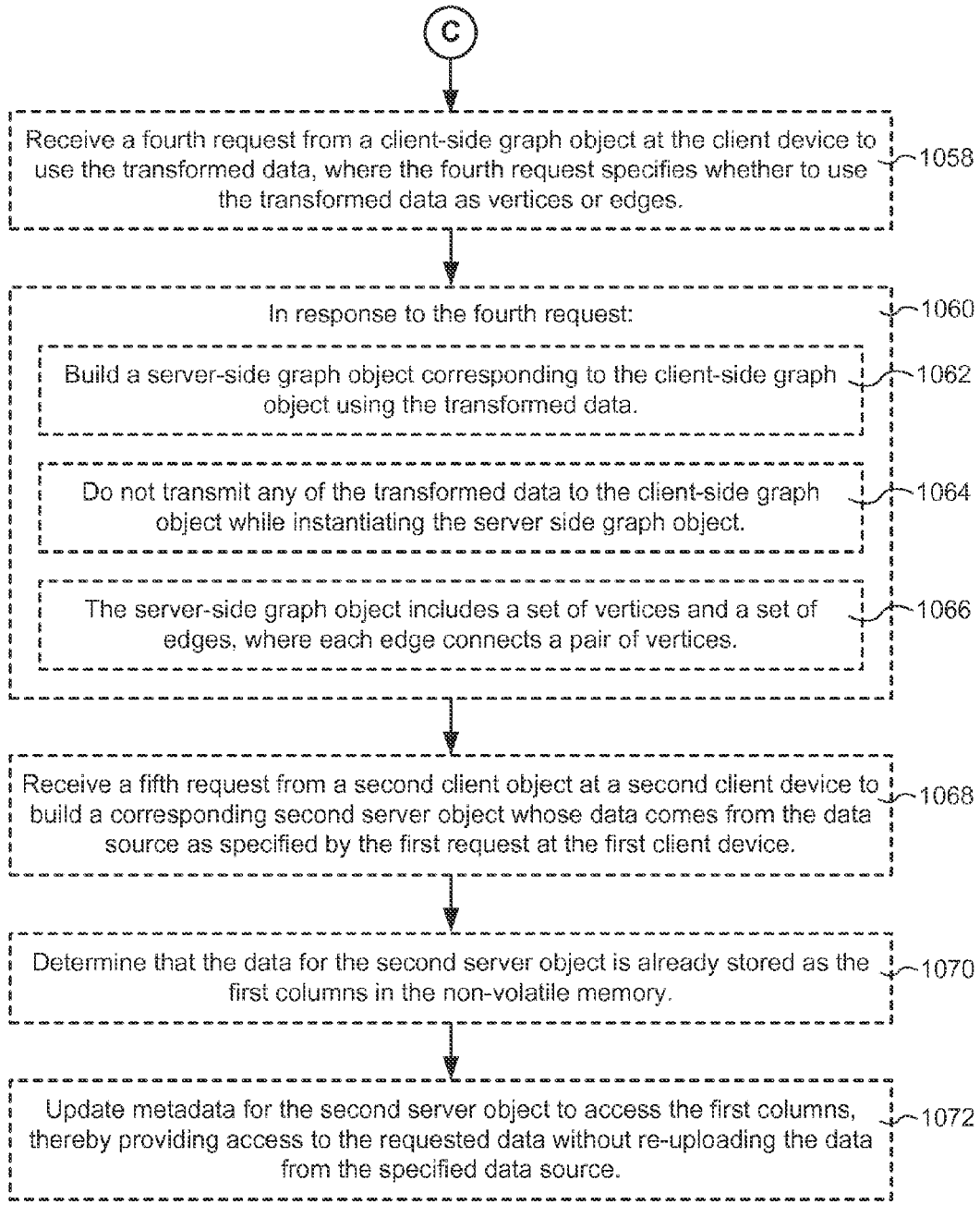

FIG. 9A provides an abbreviated table 900 of data that may be stored as an SFrame, according to some implementations. The table 900 includes data that represents customers' visits to restaurants and subsequent reviews of those restaurants. In this example, the first column "Row" 902 is a unique row identifier. The second column "User" 904 identifies the user (i.e., customer) that visited the restaurant 906. The "Rating" column 908 represents a rating of the restaurant by the user (e.g., on a scale of 1 to 5). In some instances, in addition to the rating, the user also provides some comments 910. In some implementations, the comments field 910 is a missing value if the user does not provide comments. In other implementations, the comments are blank (e.g., an empty string or a sequence of spaces) when the user does not provide comments. In some instances, a restaurant may provide a reply 912 to user ratings (e.g., in response to a bad rating, such as in row 922).

Each row 914, 916, 918, 920, 922, 924, 926, and 928 represents an individual review. When the same user visits the same restaurant multiple times, the same user may provide multiple reviews of the same restaurant, as illustrated in the C and G rows 918 and 926.

FIG. 9B is a depiction of a graph 930 created using the data from the table 900 in FIG. 9A. The nodes in the graph 930 represent the distinct users Kate, Joe, Alan, and Maria and the distinct restaurants Artemis Café, PA Square, Pizza Panda, and Cal Ave Express. Each edge represents a distinct rating or a restaurant reply. For example, the edge 914-1 represents the feedback/rating from Kate to Artemis Café. In some implementations, a first vertex has more than one relationship or interaction with another vertex, as illustrated by Kate's two reviews of PA Square corresponding to the edges 918-1 and 926-1. In some implementations, a respective vertex or a respective edge includes one or more properties. For example, the edge 924-1 representing Alan's interaction or relationship with PA Square has a property of a user rating of 1 star (as shown in the row 924 in FIG. 9A). In some instances, the table 930 includes the address of each restaurant, which can be included as properties of each restaurant vertex. In this example, the edges are directed, as indicated by the arrows. In other examples, the edges of a graph object are bidirectional.

FIGS. 10A-10D provide a flowchart of a method (1000) for operating (1002) a server-side data abstraction layer. The method is performed (1004) at a server system having one or more processors/cores, non-volatile memory, and volatile memory storing one or more programs configured for execution by the one or more processors/cores. In some implementations, the server system includes (1006) a plurality of servers, each with a one or more processors/cores, non-volatile memory, and volatile memory storing one or more programs configured for execution by the respective one or more processors/cores.

The process 1000 receives (1008) a first request from a client object at a client device 102. The first request specifies (1008) a data source 234 (e.g., a data file or database located at the server system or on another storage device external to the server). For example, the first request may be from a client-side SFrame object 224, and the request may be to construct a corresponding server-side SFrame object 324 with data corresponding to the specified data source 234.

In some instances, the data source is (1010) a CSV file stored on the client device. In some instances, the data source is (1012) a CSV file stored in the non-volatile memory of the server system. In some instances, the data source is (1014) a CSV file stored at a remote location specified by a URL. In some instances, the data source is (1016) a flat file stored at the client device. In some instances, the data source is (1018) a result set retrieved from an SQL database using an SQL query. As explained above, many other types of data sources may be used.

In response to (1020) the first request, the process 1000 uploads (1022) data from the specified data source, stores (1024) the data as a plurality of first columns 404 in the non-volatile memory, and instantiates (1026) a first server object that provides access to the first columns. Each column 404 includes (1028) a plurality of data values all having the same data type. For example, all of the entries in a first column are of the same data type, such as 32-bit integers or double precision floating point numbers.

In some implementations, each of the first columns is stored (1030) as a distinct file in the non-volatile memory. For example, consecutive columns of the data may be stored in separate files with sequential filenames. As illustrated in FIG. 8B, some implementations store two or more distinct files for each column. In some implementations, each of the first columns has (1032) the same number N of data values. In some instances, at least one of the first columns has (1034) at least one data value that is missing. This is illustrated above in the second SArray 722 in FIG. 7.

The process 1000 receives (1036) a second request from a client object at the client device. The second request specifies (1036) a transformation of the data. In some implementations, the second request is received from the same client object that made the first request. In other implementations, the second request is received from a second client object associated with the first client object. This is illustrated above in FIG. 4, where new client objects are created as each transformation is applied.

In response to (1038) the second request, the process 1000 stores (1040) one or more additional columns in the volatile memory and instantiates (1042) a second server object that provides access to the additional columns and one or more of the first columns. This was illustrated above with respect to FIG. 7. Each of the additional columns is constructed (1044) from the first columns according to the requested transformation, and each of the additional columns includes (1046) a plurality of data values all having the same data type.

In some implementations, the transformation constructs (1048) the second column using a formula. For each i in $\{1, 2, \ldots, N\}$, the formula computes (1048) the $i^{th}$ data value of the second column using the $i^{th}$ data values of one or more of the first columns. For example, as illustrated in FIG. 7, the transformation may construct a column for a fourth SArray 726 based on the existing columns for the three SArrays 720, 722, and 724.

In some instances, the process 1000 receives (1050) a third request from the client object (or an associated client object) to read the transformed data. For example, the client object requests to read the data from the fourth SArray 726 from the previous example. In response to (1052) the third request, the process 1000 retrieves (1054) the corresponding additional columns and one or more first columns from the non-volatile storage and transmits (1056) the retrieved additional columns and one or more first columns to the client device.

In some implementations, the process 1000 receives (1058) a fourth request from a client-side graph object at the client device to use the transformed data. The fourth request specifies (1058) whether to use the transformed data as vertices or edges.

In response to (1060) the fourth request, the process 1000 builds (1062) a server-side graph object 330 corresponding to the client-side graph object, where the server-side graph object 330 uses the transformed data. The process of building the server-side graph object 330 does not transmit (1064) any of the transformed data to the client-side graph object. That is, the process of building the server-side graph object 330 is essentially self-contained at the server system 104. The server-side graph object 330 includes (1066) a set of vertices 332 and a set of edges 336, where each edge connects (1066) a pair of vertices.

In some implementations, the process 1000 receives (1068) a fifth request from a second client object at a second client device to build a corresponding second server object whose data comes from the data source as specified by the first request at the first client device. In some instances, the process 1000 determines (1070) that the data for the second server object is already stored as the first columns in the non-volatile memory. When the data for the second server object is already stored in the non-volatile memory, the process 1000 does not store the data again. Instead, the process 1000 updates (1072) the metadata for the second server object to access the first columns, thereby providing access to the requested data without re-uploading the data from the specified data source.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of operating a server-side data abstraction layer, comprising:
    at a server system having one or more processors, non-volatile memory, and volatile memory storing one or more programs configured for execution by the one or more processors:
        receiving a first request from a first client object at a first client device, wherein the first request specifies a data source;
        in response to the first request:
            uploading data from the specified data source;
            storing the data as a plurality of first columns in the non-volatile memory; and
            instantiating a first server object that provides access to the first columns, wherein each column of the plurality of first columns comprises a plurality of data values all having the same data type;
        receiving a second request from the first client object at the first client device, wherein the second request specifies a transformation of the data; and
        in response to the second request:
            constructing, from the first columns according to the requested transformation, one or more additional columns comprising a plurality of data values all having the same data type;

storing the one or more additional columns in the volatile memory; and instantiating a second server object that provides access to the additional columns at the volatile memory and one or more of the first columns at the non-volatile memory.

2. The method of claim 1, wherein the data source is selected from the group consisting of:
a CSV file stored on the first client device;
a CSV file stored in the non-volatile memory of the server system;
a CSV file stored at a remote location specified by a URL;
a flat file stored at the first client device; and
a result set retrieved from an SQL database using an SQL query.

3. The method of claim 1, further comprising:
receiving a request from the first client object to read the transformed data;
in response to the request to read the transformed data, retrieving the corresponding additional columns and one or more first columns from the non-volatile storage and transmitting the retrieved additional columns and one or more first columns to the first client device.

4. The method of claim 1, further comprising:
receiving a request from a client-side graph object at the first client device to use the transformed data, wherein the request specifies whether to use the transformed data as vertices or edges;
in response to the request, building a server-side graph object corresponding to the client-side graph object, the server-side graph object using the transformed data, and not transmitting any of the transformed data to the client-side graph object, wherein the server-side graph object comprises a set of vertices and a set of edges, each edge connecting a pair of vertices.

5. The method of claim 1, wherein each of the first columns is stored as a distinct file in the non-volatile memory.

6. The method of claim 1, wherein each of the first columns has the same number N of data values.

7. The method of claim 6, wherein at least one of the first columns has at least one data value that is missing.

8. The method of claim 6, wherein the transformation constructs a second column of the additional columns using a formula, wherein for each i in $\{1, 2, \ldots, N\}$, the formula computes the ith data value of the second column using the ith data values of one or more of the first columns.

9. The method of claim 1, wherein the server system comprises a plurality of servers, each with a one or more processors, non-volatile memory, and volatile memory storing one or more programs configured for execution by the respective one or more processors.

10. The method of claim 1, further comprising:
receiving a request from a second client object at a second client device to build a corresponding second server object whose data comes from the data source as specified by the first request at the first client device;
determining that the data for the second server object is already stored as the first columns in the non-volatile memory;
updating metadata for the second server object to access the first columns, thereby providing access to the requested data without re-uploading the data from the specified data source.

11. A server system, comprising one or more servers, each having:
one or more processors;
non-volatile memory; and
volatile memory storing one or more programs configured for execution by the one or more processors, the one or more programs comprising instructions that cause the one or more processors to perform operations including:
receiving a first request from a first client object at a first client device, wherein the first request specifies a data source;
in response to the first request:
uploading data from the specified data source;
storing the data as a plurality of first columns in the non-volatile memory; and
instantiating a first server object that provides access to the first columns, wherein each column of the plurality of first columns comprises a plurality of data values all having the same data type;
receiving a second request from the first client object at the first client device, wherein the second request specifies a transformation of the data; and
in response to the second request:
constructing, from the first columns according to the requested transformation, one or more additional columns comprising a plurality of data values all having the same data type;
storing the one or more additional columns in the volatile memory; and
instantiating a second server object that provides access to the additional columns at the volatile memory and one or more of the first columns at the non-volatile memory.

12. The server system of claim 11, wherein the data source is selected from the group consisting of:
a CSV file stored on the first client device;
a CSV file stored in the non-volatile memory of the server system;
a CSV file stored at a remote location specified by a URL;
a flat file stored at the first client device; and
a result set retrieved from an SQL database using an SQL query.

13. The server system of claim 11, the one or more programs further comprising instructions that cause the one or more processors to perform operations including:
receiving a request from a client-side graph object at the first client device to use the transformed data, wherein the request specifies whether to use the transformed data as vertices or edges;
in response to the request, building a server-side graph object corresponding to the client-side graph object, the server-side graph object using the transformed data, and not transmitting any of the transformed data to the client-side graph object, wherein the server-side graph object comprises a set of vertices and a set of edges, each edge connecting a pair of vertices.

14. The server system of claim 11, wherein each of the first columns is stored as a distinct file in the non-volatile memory.

15. The server system of claim 11, wherein each of the first columns has the same number N of data values.

16. The server system of claim 15, wherein at least one of the first columns has at least one data value that is missing.

17. The server system of claim 15, wherein the transformation constructs a second column of the additional columns using a formula, wherein for each i in $\{1, 2, \ldots, N\}$, the formula computes the ith data value of the second column using the ith data values of one or more of the first columns.

18. A non-transitory, computer readable storage medium storing one or more programs configured for execution by one or more processors of a server system having non-volatile memory and volatile memory, the one or more programs comprising instructions that cause the one or more processors to perform operations including:
  receiving a first request from a first client object at a first client device, wherein the first request specifies a data source;
  in response to the first request:
    uploading data from the specified data source;
    storing the data as a plurality of first columns in the non-volatile memory; and
    instantiating a first server object that provides access to the first columns, wherein each column of the plurality of first columns comprises a plurality of data values all having the same data type;
  receiving a second request from the first client object at the first client device, wherein the second request specifies a transformation of the data; and
  in response to the second request:
    constructing, from the first columns according to the requested transformation, one or more additional columns comprising a plurality of data values all having the same data type;
    storing the one or more additional columns in the volatile memory; and
    instantiating a second server object that provides access to the additional columns at the volatile memory and one or more of the first columns at the non-volatile memory.

19. The non-transitory computer readable storage medium of claim 18, the one or more programs further comprising instructions for:
  receiving a request from a client-side graph object at the first client device to use the transformed data, wherein the request specifies whether to use the transformed data as vertices or edges;
  in response to the request, building a server-side graph object corresponding to the client-side graph object, the server-side graph object using the transformed data, and not transmitting any of the transformed data to the client-side graph object, wherein the server-side graph object comprises a set of vertices and a set of edges, each edge connecting a pair of vertices.

20. The non-transitory computer readable storage medium of claim 18, wherein each of the first columns has the same number N of data values.

21. The non-transitory computer readable storage medium of claim 20, wherein the transformation constructs a second column of the additional columns using a formula, wherein for each i in $\{1, 2, \ldots, N\}$, the formula computes the ith data value of the second column using the ith data values of one or more of the first columns.

* * * * *